US005714864A

United States Patent [19]
Rose et al.

[11] Patent Number: 5,714,864
[45] Date of Patent: Feb. 3, 1998

[54] CAPACITIVE CHARGE COUPLING WITH DUAL CONNECTOR ASSEMBLIES AND CHARGING SYSTEM

[75] Inventors: Jeffrey A. Rose, Park City, Utah; Joseph A. Cates, Lexington, Ky.

[73] Assignee: Electro Dynamics, Inc., Park City, Utah

[21] Appl. No.: 779,749

[22] Filed: Jan. 10, 1997

Related U.S. Application Data

[60] Provisional application No. 60/009,789, Jan. 16, 1996.
[51] Int. Cl.[6] ........................................ H01M 10/44
[52] U.S. Cl. ................................... 320/2; 439/34
[58] Field of Search ........................ 320/1, 2, 15; 361/311, 361/313, 301.1, 303; 439/34, 609; 307/109; 445/41

[56] References Cited

U.S. PATENT DOCUMENTS

| 4,357,646 | 11/1982 | McVey et al. | 200/600 |
|---|---|---|---|
| 4,373,124 | 2/1983 | Frame | 200/600 |
| 4,386,386 | 5/1983 | Akita | 361/283.1 |
| 4,629,019 | 12/1986 | Harrington et al. | 177/210 |
| 4,835,373 | 5/1989 | Adams et al. | 235/451 |
| 4,931,806 | 6/1990 | Wunderlich | 343/715 |
| 5,157,319 | 10/1992 | Klontz et al. | 320/2 |
| 5,220,268 | 6/1993 | Rose et al. | 320/2 |
| 5,252,078 | 10/1993 | Langenbahn | 439/34 |
| 5,264,776 | 11/1993 | Hulsey | 320/2 |
| 5,327,065 | 7/1994 | Bruni et al. | 320/2 |
| 5,336,934 | 8/1994 | Toepfer et al. | 307/10.1 |
| 5,399,106 | 3/1995 | Ferry | 439/620 |
| 5,401,174 | 3/1995 | Hansen | 439/34 |
| 5,431,584 | 7/1995 | Ferry | 439/620 |
| 5,458,496 | 10/1995 | Itou et al. | 439/34 |
| 5,462,439 | 10/1995 | Keith | 439/34 |

Primary Examiner—Peter S. Wong
Assistant Examiner—Gregory J. Toatley, Jr.
Attorney, Agent, or Firm—King and Schickli

[57] ABSTRACT

A disengageable electrical capacitive coupling for transmitting high frequency AC electrical current is provided. In an electric vehicle charging system, dual first connectors form the vehicle inlet, and mating dual second connectors form the coupler. A dielectric material, such as barium titanium oxide, is positioned between the connectors to form capacitors. A holder secures the connectors together with the dielectric material in between. The interface formed is sufficient for establishing a highly efficient, compact electrostatic field for transmitting the current. Provision is made in the holder for easily disengaging the connectors once the charging cycle is complete. When utilized as a charging system, the capacitive charge coupling is connected between a high frequency drive unit on the charger side and a DC power conversion unit on the energy storage side, such as in an electric vehicle. In an alternative embodiment, the connectors comprise mating multiple section conductive plates formed of a spring metal core with a flexible dielectric coating, such as polypropylene. Variation of the various parameters of the charge coupling is utilized to enhance the power transfer capability.

20 Claims, 7 Drawing Sheets

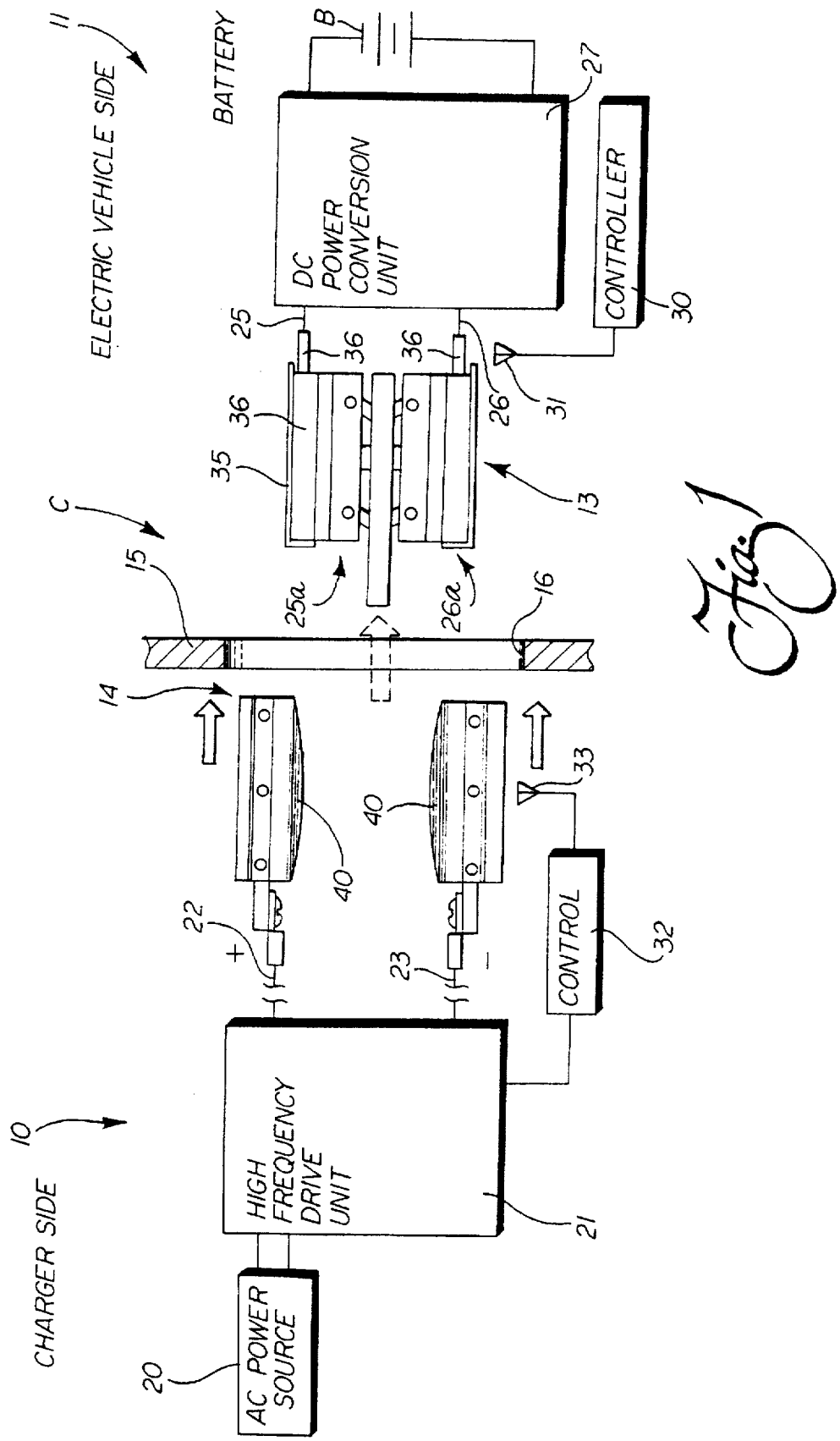

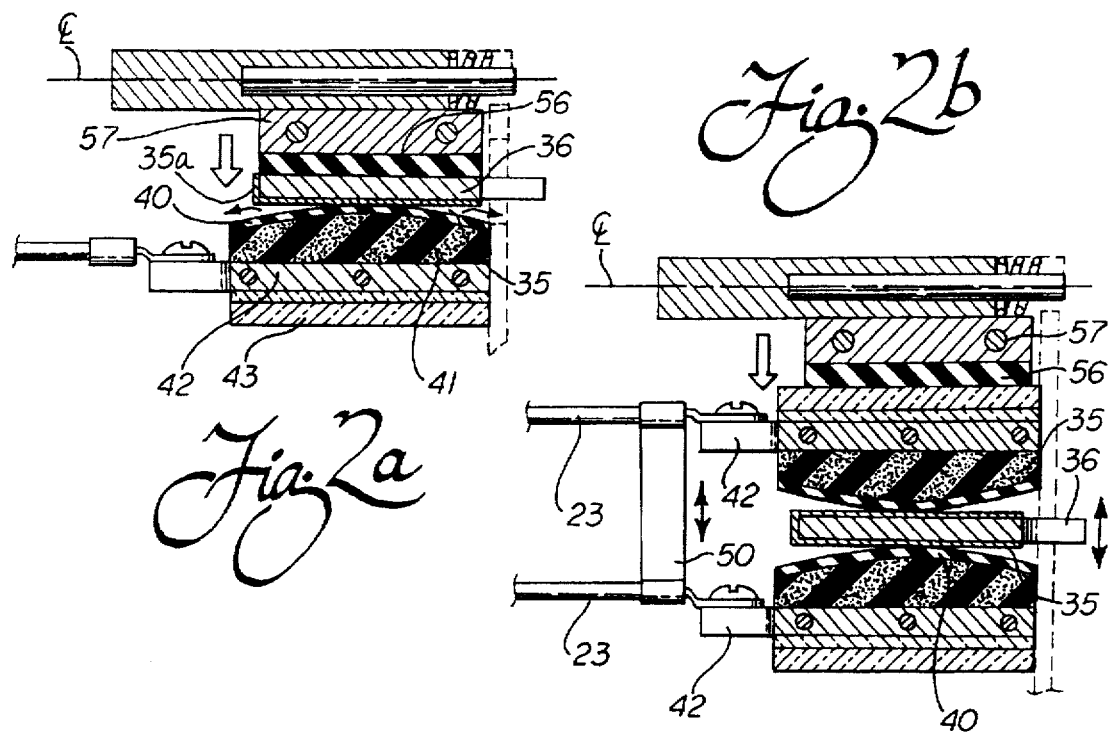
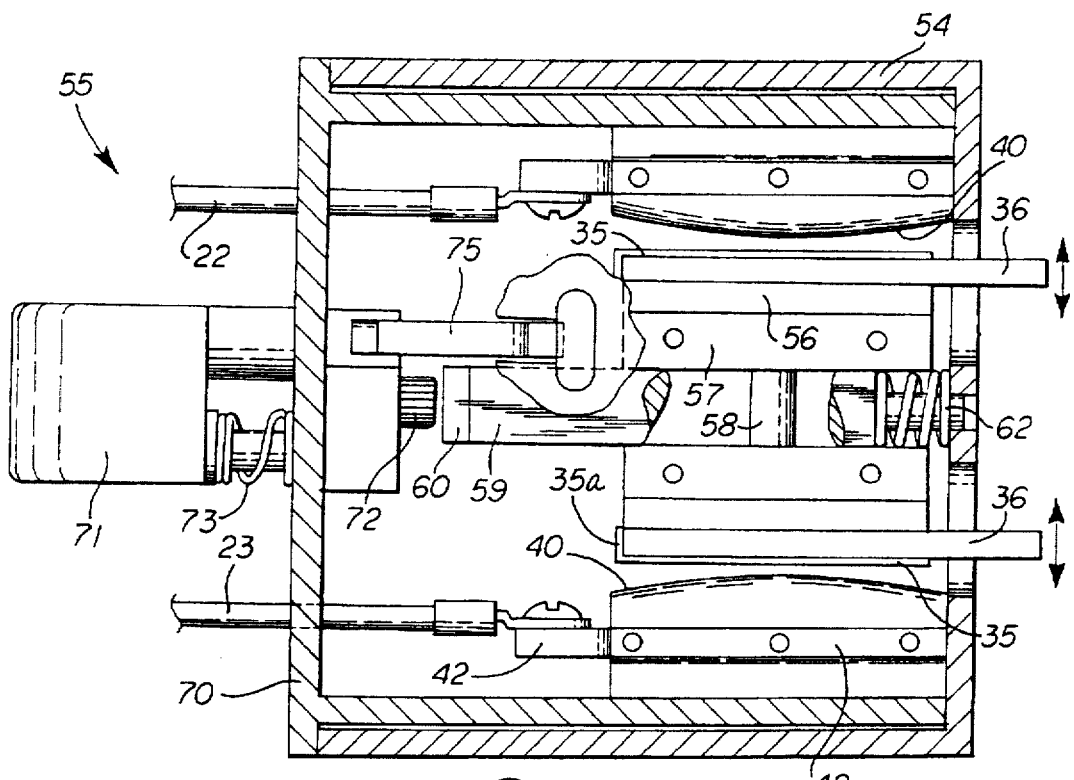

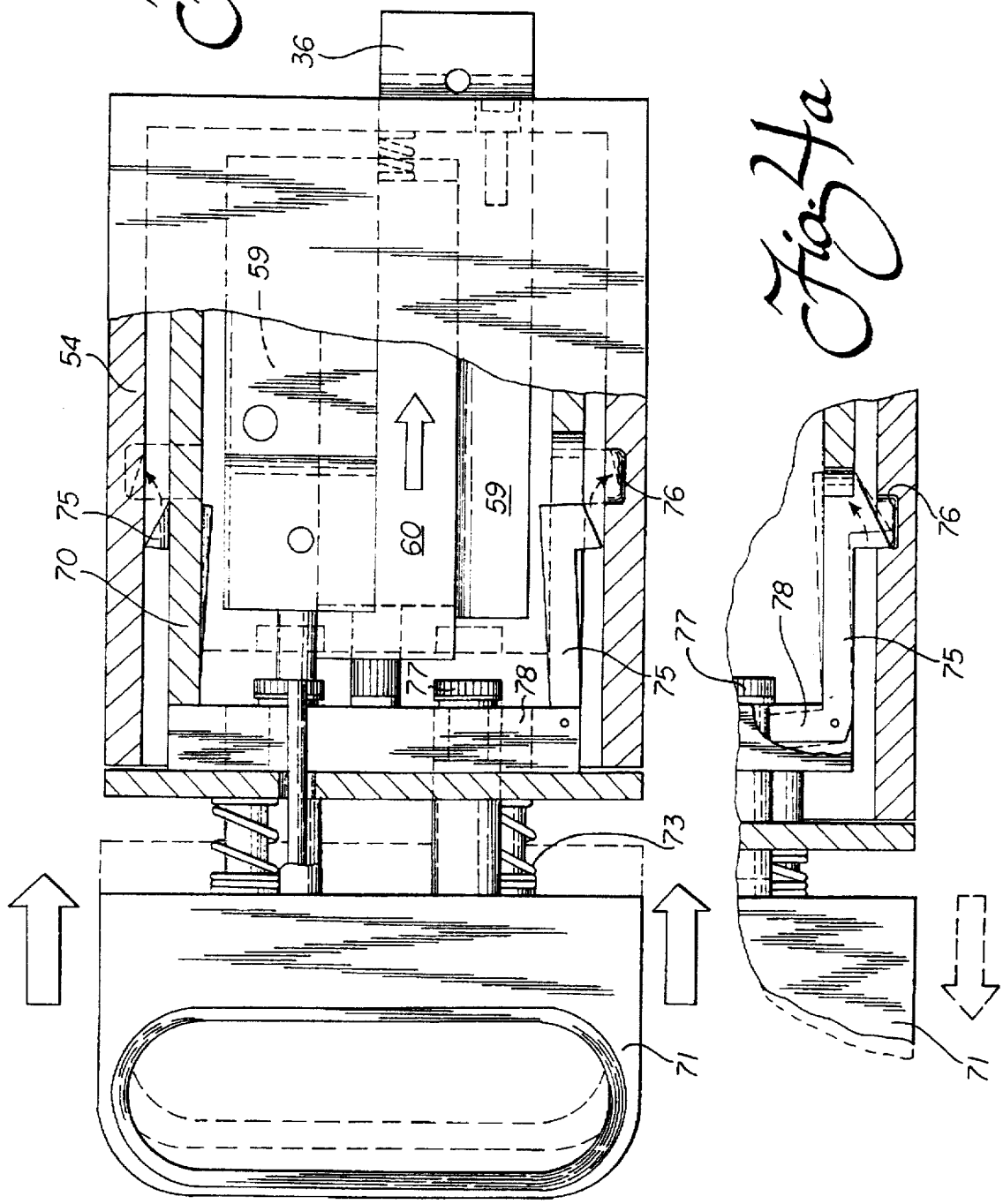

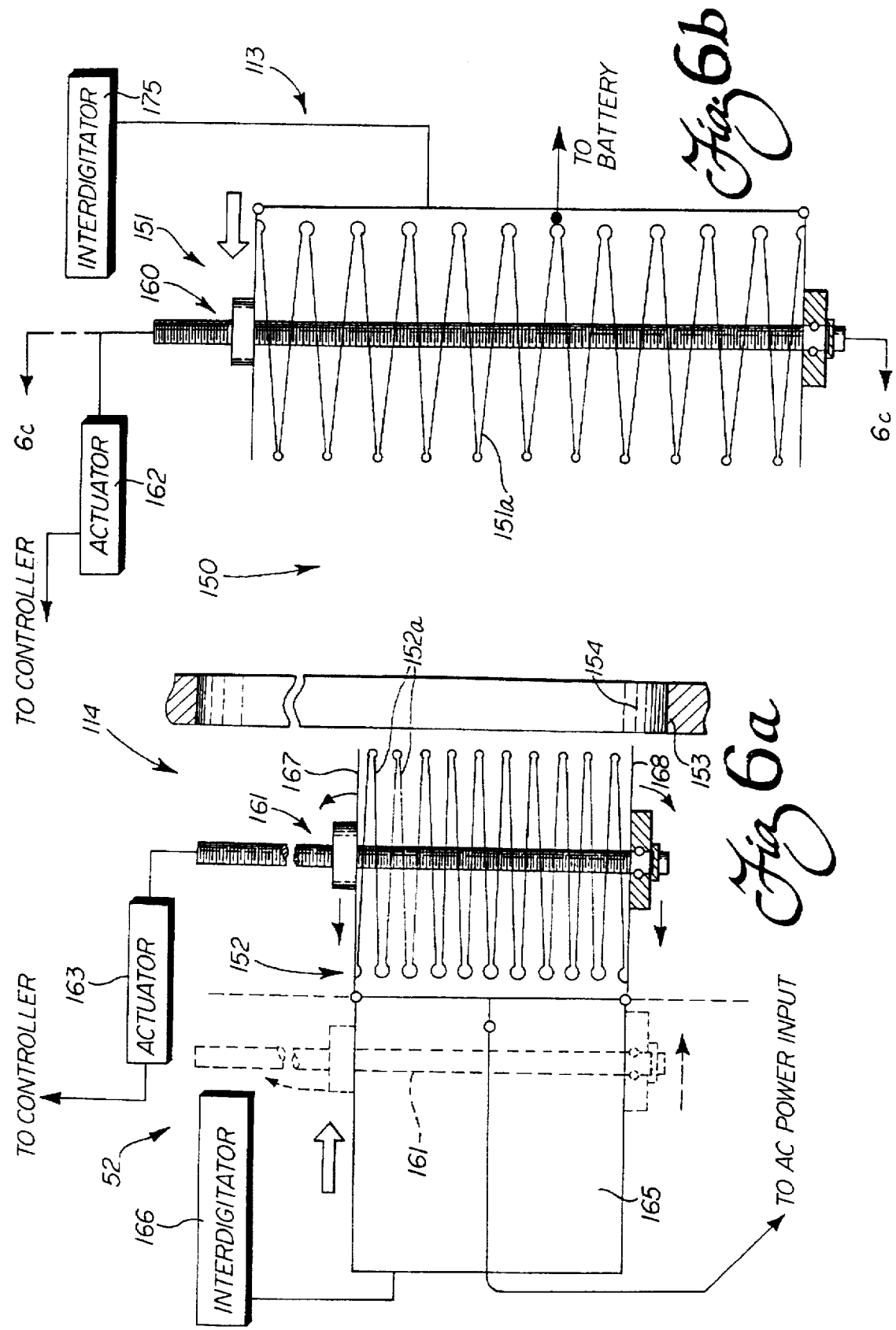

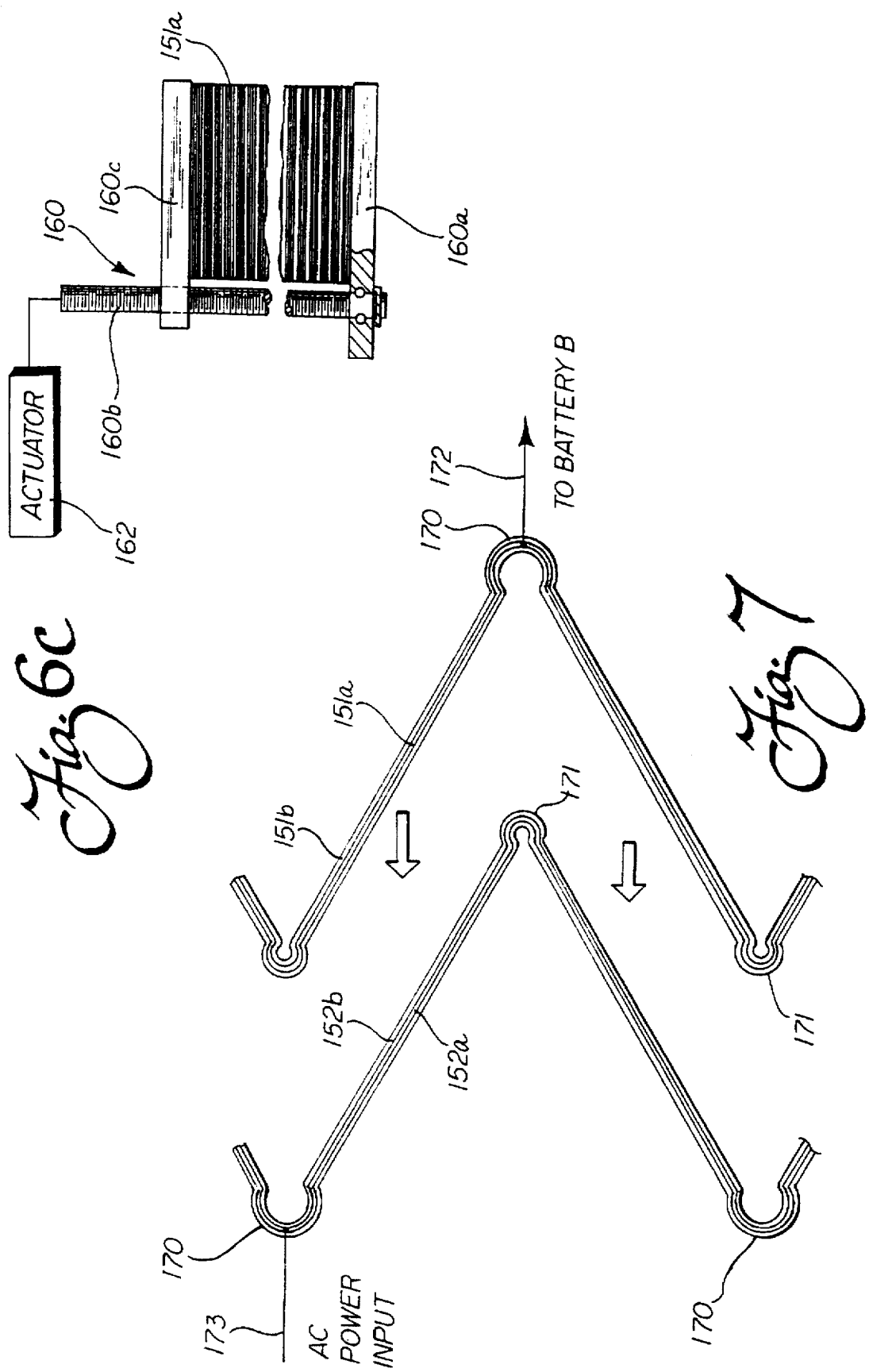

CAPACITIVE CHARGE COUPLING WITH DUAL CONNECTOR ASSEMBLIES AND CHARGING SYSTEM

This is a regular utility patent application with priority based on provisional patent application, Ser. No. 60,009,789, filed Jan. 16, 1996 and entitled Capacitive Coupler With Dual Connector Assemblies and Charging System.

BACKGROUND OF THE INVENTION

The present invention relates generally to electrical coupling systems, and more particularly to an improved charge coupling with dual connector assemblies for use in interconnecting a charger to an energy storage device, such as a battery, that can be used in electric vehicles or the like.

It is anticipated that electric vehicle use will increase substantially in the next few decades. Many are anticipating that this mode of transportation will soon dominate on the nation's highways. Of course, with the coming of the electric vehicle, it is necessary to have electric recharging stations located at various points along the highways, as well as in the vehicle owner's residence and place of business. One of the problems to overcome in providing these recharging stations is to make the coupler from the charger that mates with the vehicle inlet safer. In addition to safety, other considerations are low initial cost, minimum power loss and improved reliability.

In the past and with currently available technology, most of the development activity has been in the area of conductive type couplers. In other words, bare metal conductors are provided on a coupler/plug on the charger side and mating bare metal conductors are provided in the vehicle inlet or socket on the electric vehicle side. The vehicle user provides the connection by placing the coupler on the charger side into the inlet on the electric vehicle side. Because of the high current and voltage requirements to recharge electric vehicles, the hazard of electrical shock is very real. This is particularly true when untrained and unskilled users are involved.

A substantial amount of the research, development and patent activity for conductor type couplers has been in the area of providing interlock mechanisms to attempt to make this type of coupler safe from electrical shock to the user. One of the most successful couplers of this type, especially adapted for electric golf carts and other small vehicles, is illustrated in U.S. Pat. No. 5,220,268, entitled "Battery Charging System and Connection Apparatus Therefor". As set forth in the '268 patent, an electrical circuit includes a microswitch positioned in the socket and operated by the coupler from the charger side. The microswitch advantageously serves to interrupt the flow of electricity prior to and during mating of the conductors. While this feature has proven to be a successful innovation in improving the conductive type coupler, the circuit is relatively expensive, and over time there is still some chance of service being required to assure reliable operation.

The attempt to make conductor type couplers acceptable for safe public use has lead other inventors to go to other and extreme efforts to find additional safety features. For example, in the recently issued U.S. Pat. No. 5,336,934, entitled "Electrical Connection and Interlock Circuit System for Vehicle Electric Drive", a much more elaborate and expensive interlock system is illustrated. Not only is the cost of such a system very high, but its complexity is believed to inevitably lead to substantial maintenance and service problems. Other inventors have concentrated on attempting to directly improve over the '268 patent by changing the mechanical design of the entire charge coupling, such as shown in U.S. Pat. No. 5,458,496, entitled "Charge Coupling for Electric Vehicle". Like the effort to provide new and better electrical interlock systems, this inevitably leads to an even more highly complicated, expensive and maintenance intensive result.

The dilemma faced by the inventors trying to improve the electric interlock circuits and mechanical features of the charge coupling, as typified in the '934 and '496 patents, has been recognized by some. For example, in the U.S. Pat. No. 5,327,065, entitled "Hand Held Inductive Charger Having Concentric Windings", a typical effort to find a successful inductive coupling is shown. Again, the effort has lead to a relatively expensive approach due to the cost of the expensive primary and secondary coil windings, and additional circuitry required. At the same time, the weight of the coupler is greatly increased. Furthermore, this approach of utilizing inductive transfer of electricity has inherent in it substantial power loss, due to hystersis and eddy current losses, including skin effect losses and proximity effect losses. These power losses are believed to increase exponentially at higher frequencies, as required for efficient high capacity charging. The heat generated becomes a problem since it must be dissipated requiring still more ancillary equipment and more extra initial cost. Finally, inductive charge couplings have potentially dangerous and annoying side effects, such as causing damage to personal items, such as electronic equipment including pace makers and watches, as a result of the surrounding magnetic field.

Accordingly, a need still exists for an alternating current (AC) coupling, charge coupling and related charging system that is safe and convenient for general public use, and especially for use for battery recharging of electric vehicles. The new charge coupling must be low in initial cost, in addition to being safe, and must be highly efficient so as to have minimal power loss, low maintenance requirements, no dangerous or annoying side effects and have high reliability in use.

SUMMARY OF THE INVENTION

Accordingly, one aspect of the present invention is to provide a capacitive coupling adapted for use for charging energy storage devices, such as a battery, or group of batteries, for an electric vehicle. The coupling of the present invention is particularly efficient in transmitting high frequency electrical current at relatively high voltage with substantially no power loss, especially in the environment of recharging of an electric vehicle. The coupling comprises mating dual connector assemblies mounted on the coupler and the vehicle inlet that are safe since there is no exposed electrical conductor. Thus, the need for interlock circuits within the charging system and/or expensive plug arrangements of the prior art is now reduced. The current transmission is made based on the principles of capacitance, rather than conductance or inductance, as has been the practice in the past.

Specifically, the dual capacitive connector assemblies of the coupling of the present invention include first and second connectors. In the preferred embodiment the operative surface of the first connector of the assembly for the inlet is formed by a high dielectric constant ceramic plate mounted on a conductive element to form a composite plate element. Each ceramic plate has an area of approximately 25 square inches and a thickness in the range of 0.007 to 0.045 inch. A preferred ceramic is barium titanium oxide ($BaTiO_3$) as this material exhibits a high dielectric constant, such as in the range of 7,000–12,000, and is proceeding higher as the ceramic technology advances. Operating at 400–500 volts, a charging current of 6–18 amps, and higher is obtained when mated with a second connector in the connector assembly of the coupler. While the second connector can also be a dielectric, preferably it takes the form of a deformable conductor, such as conductive elastomer or metal sheet forming a plate backed by a foam base on a conductive element. A preferred sheet to form the operative surface of this second connector is silicone rubber impregnated with micron-sized silver coated copper spheres.

To provide an optimum interface between the connectors of this preferred embodiment, the base of the second connector can be convex so that during coupling by pressing the dielectric ceramic plate against the elastomer plate, any tendency for an air gap to form is eliminated. Similarly, in order to further assure that the interface is substantially free of an air layer, the ceramic plate is ground and lapped to a high finish, and a highly polished mold is used to form the mating elastomer plate.

As desired for isolation from the user, shielding doors (not shown) can be provided across the coupler as a back-up to the charger control. If necessary, a suitable mechanical interlock arrangement, such as illustrated in the '268 patent can also be employed to further isolate the second connector. In addition, an RF communication circuit provides for lock out of the electrical power from the drive unit 21 until there is full engagement of the coupler 14 within the inlet 13. All exposed conductive surfaces of the first connector, that is all surfaces not covered by the ceramic plate, are also coated with a dielectric material.

A novel manual arrangement for holding the coupler in the inlet of the vehicle is provided. It includes a telescoping slide for the coupler and a hollow housing for the inlet. The first connectors are mounted back to back for lateral movement in an outward direction. The second connectors are fixedly mounted in the slide facing inwardly, and when the slide is fully inserted are in opposed relationship to the first connectors. The slide includes a spring loaded handle that actuates a toggle mechanism to simultaneously move the first connectors outwardly as the slide becomes fully inserted. This causes the ceramic plates of the first connectors to press firmly against the deformable elastomer plates of the second connectors to form an interface sufficient for establishing a compact electrostatic field, and thus form the charge coupling. Dual latching fingers operated by the handle hold the slide securely in position. To disengage the coupler and interrupt the electrical power, the fingers are withdrawn and the slide is pulled out of the inlet by the handle.

In an alternative embodiment, both the first and second connectors of the connector assemblies of the coupler/inlet are formed of multi-section, composite plate element with all surfaces coated with a dielectric material. Thus in this embodiment, when the charge coupling, including the two connector assemblies, is disengaged or disconnected, there are no exposed conductive surfaces that could provide an electric shock and harm to the user. Preferably in all embodiments, the second connectors, usually on the movable or slidable coupler, are connected to the AC power source through a high frequency drive unit on the charger side at the recharging station. The first connectors are provided as a part of the inlet of the electric vehicle. The inlet having the first connectors is accessible through an access port. These first connectors are of course coupled to the energy storage device through a DC power conversion unit.

In order to mate the composite multiple section plate elements having the dielectric plates of the first connector with the plates of the second connector in either disclosed embodiment, the present invention envisions the use of a power interdigitator and holder. One approach in this respect is illustrated in connection with the alternative embodiment, as will be described more in detail below.

In this alternative embodiment, each multi-section, composite plate element includes a thin conductive element as a core with a thin dielectric coating on both sides to form the dielectric plates, as described above. Each connector is fan folded to provide the double-sided, relatively large surface area plate in a relatively compact area. A pair of interdigitators or shifters, one on each of the connectors, such as electric linear motors, are used to move the pair of second connectors through the port, into proximity with the first connectors in the inlet. Additional motors then move each of the first connectors to interdigitate, and be held with the corresponding second connector.

In order to make the interdigitation of the fan folded plates of this embodiment easier and reliable, the first and second connectors are first expanded. This is accomplished by built-in resilient memory of the connectors. Each juncture between two composite plate elements forms a curved leaf spring for this purpose. Once interdigitation is accomplished, a holder compresses the connectors together, to in effect form the capacitor for transmittal of the electric current.

The center core conductive element is formed of thin, spring-like metal alloy, such as beryllium/copper or phosphorous bronze. Each spring juncture is effective to automatically open the connector for interdigitation. Preferably, the flexible, folded sections of the two composite plate elements snap together at the junctures as they are brought together.

Once the dielectric plates are fully engaged, the holder compresses and secures the plates together in face-to-face relationship forming an interface sufficient for establishing a compact electrostatic field so as to provide efficient transfer of the charging electric current by capacitance action. To disengage the coupler, the holder is released and the multiple section plates are withdrawn from each other so that the charging current is interrupted.

The dielectric coating should have a high dielectric constant and be of a high dielectric strength. An excellent choice for the coating for the plates of the connector assembly of this alternative embodiment is polypropylene. This is especially a good choice since it exhibits one of the highest dielectric constants of available plastic/elastomer materials, has a high dielectric strength and is particularly useful in pulse handling circuits. In addition, the polypropylene is a good choice as it is flexible and can reliably coat the spring junctures of the folded plates. Ideally, the dielectric coating should be in the range of 0.005–0.020 inch and covers the entire plate surfaces, including the edges of the plates. Other suitable dielectrics include metalized polyester, polycarbonate, polystyrene, and polyphenylene sulfide, or titanium dioxide enamel, as well as other ceramic materials.

Whereas in the preferred embodiment the dielectric constant K of the ceramic is in the range of 7,000–12,000, in this alternative embodiment the K is more in the range of 1.5–4.0 and the combined thickness of the coatings in the range of 0.010–0.040 inch. A negative differential factor of approximately 3,300 in the K, compared to when the preferred ceramic is used, is apparent. However, by reducing the thickness of the dielectric, a positive factor of 3 partially overcomes this negative factor. The remaining factor delta of approximately 1,100 is offset by the substantial increase in the interface area that is built into the multiple section, composite plate elements of this alternative charging system.

Other alternative arrangements that can be used for interdigitating the composite plate elements to form the charge coupling of the present invention can comprise a plurality of these flexible composite plate elements facing each other and a threaded shaft that extends upwardly through the adjacent edges of the plate elements to lift them at an acute angle when extended upwardly. The shaft releases the plate elements one at a time in an alternative fashion. In this arrangement, the plate elements are accurately positioned together, alternating like shuffling of a deck of cards. In still another such embodiment, the capacitive connection of the charge coupling is formed by mating spiral roll plate elements that are engaged with each other in an interdigitating fashion.

In any of the embodiments, once the dielectric plates, or one dielectric and one conductive plate, are positioned together, a holder is provided to clamp in firm face-to-face engagement for establishing a relatively high pressure interface to provide efficient electric power transfer by the capacitive effect established.

Thus, a primary object of the present invention is to provide a disengageable capacitive electrical coupling that allows connection of a high frequency A.C. power source to an operative device, such as a charger for efficient charging of an electric energy storage device, including in an electric vehicle battery.

A further object of the present invention is to provide a charging system that is based on a charge coupling operating on the principle of capacitance for more efficient electrical current transmission and in order to reduce the possibility of electric shock to the user when disconnected. A related object is to provide such a charge coupling and system that is low cost, maintenance free, no annoying side effects and highly reliable for transferring electric current.

An additional object of the present invention is to provide an improved charge coupling for a battery charging system using the capacitive principle and having novel features for holding the coupler in the inlet of the vehicle during charging.

Additional objects, advantages and other novel aspects of the invention will be set forth in part in the description that follows, and in part will become apparent to those skilled in the art upon examination of this description, or may be learned with the practice of the invention. The objects and advantages of the invention may be realized and obtained by means of the instrumentalities in combinations particularly pointed out in the appended claims.

BRIEF DESCRIPTION OF THE DRAWINGS

FIG. 1 is a schematic view of a preferred embodiment of the charging system of the present invention illustrating the manner in which the charge coupling is formed;

FIG. 2 is a cross sectional view of the coupler mating with the inlet of an electric vehicle, and with the connectors separated in a standby position;

FIG. 2a is an enlarged partial view of the inlet connector assembly with the first and second connectors partially engaged;

FIG. 2b is an enlarged partial view of the inlet connector assembly of a different embodiment wherein dual second connectors are provided on each side of the coupler to engage a single first connector with oppositely facing dielectric plates;

FIGS. 4, 4a show the coupler/inlet and the latching assembly of the holder being engaged and disengaged, respectively;

FIGS. 6a and 6b are schematic showings of the mating connectors utilizing the fan or accordion folded composite plate elements with dielectric coating, and illustrating the manner in which the connectors are brought together, interdigitated and then held together during operation;

FIG. 6c is a schematic cross sectional view taken along line 6c—6c of FIG. 6b illustrating the C-shaped holder for the folded plate elements and representative of holding/clamping together; and FIG. 7 is a enlarged detailed view of composite plate elements of folded sections, the spring junctures being nestable with snap action and allowing compression into face-to-face engagement.

Figure 3:
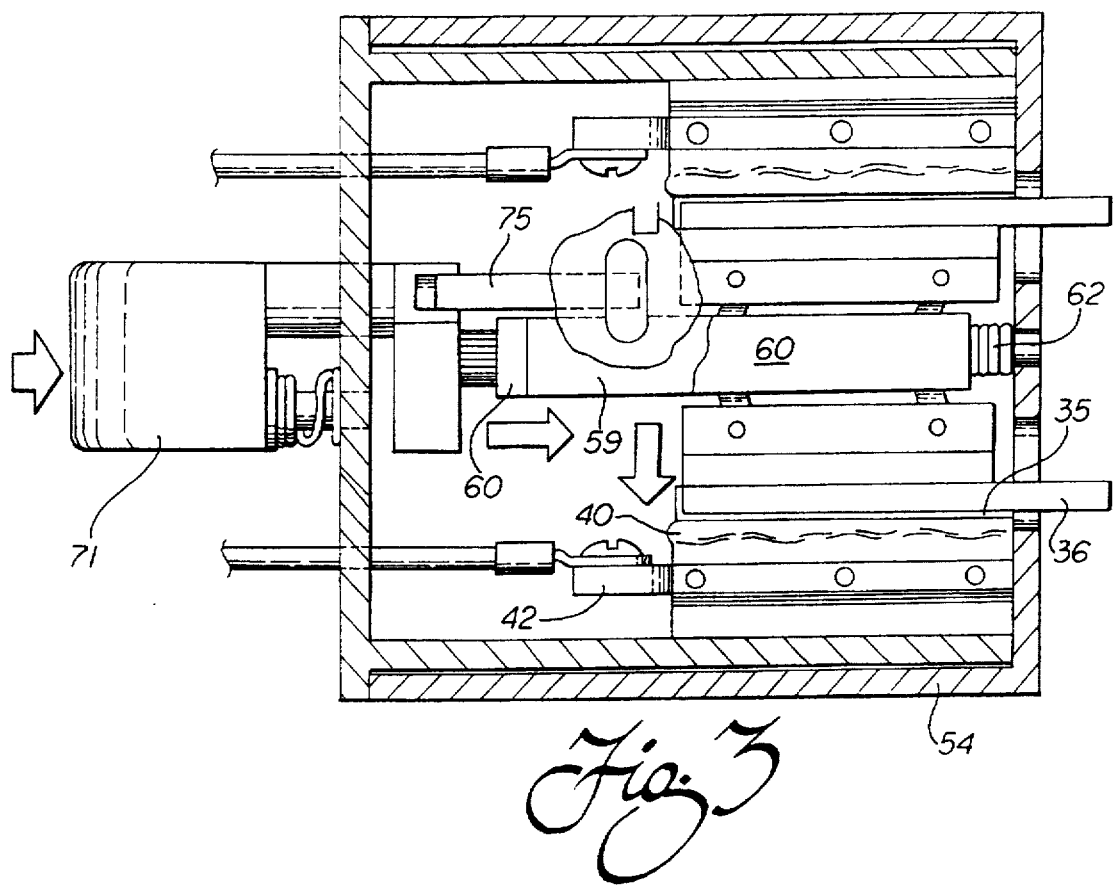
FIG. 3 is a view similar to FIG. 2 but illustrating full engagement of the connectors for transmission of electric current.

Reference will now be made in detail to the present preferred embodiment and alternative embodiments of the invention, examples of which are illustrated in the accompanying drawings.

DETAILED DESCRIPTION OF THE PREFERRED EMBODIMENT

With reference now to FIG. 1 of the drawings, a disengageable capacitive charge coupling is illustrated and constructed in accordance with the present invention; the charge coupling being generally designated by the reference indicia C. It will become apparent that the coupling C is primarily useful in an environment for charging an energy storage device, such as a battery B. As illustrated, the charging system includes a charger side 10 and an electric vehicle side 11 to illustrate the one preferred environment in which the charge coupling C is utilized in a very efficient manner. In other instances in accordance with the broadest aspects of the invention where high frequency, A.C. power of relatively high charging current is to be transmitted at relatively high voltage, and the same benefits of capacitive power transfer are desired, the system of the present invention is also utilized in an efficient manner. Thus, it will be apparent that the other uses provide the same characteristics and advantages with respect to the charging system for the electric vehicle of the preferred embodiment.

On the electric vehicle side 11, there is provided an inlet with a first dual connector assembly, generally designated by the reference numeral 13. A coupler has a second dual connector assembly, and is generally designated by the reference numeral 14. The wall 15 represents a part of the electric vehicle that has an access port 16 through which the coupler 14 and the inlet 13 are able to combine. As will be seen in more detail below, the coupler 14 in inserted through the port 16, as shown by the full direction arrows adjacent the coupler, and the dashed line arrow passing through the port 16.

On the charger side 10, an AC power source 20 feeds a high frequency drive unit 21, which in turn supplies high frequency electrical current at relatively high voltage to positive and negative leads 22, 23. After passing through the charge coupling C made up of the combined coupler/inlet 14/13, the current flows through lines 25, 26 into a DC power conversion unit, wherein the high frequency AC current is rectified and filtered, and in turn is fed to the circuit containing the battery B.

For communications between the conversion unit 27 and the high frequency drive unit 21, a communications link is provided. A controller 30, is coupled to the conversion unit 27 and provides feedback of the voltage and other parameters, through an antenna 31. In turn, a control 32 for feeding signals to regulate the operation of the drive unit 21 receives its signals through a matching antenna 33 on the charger side 10. Until the proper communications link is established by the antennae 31, 33 indicating that the inlet/coupler 13, 14 is fully engaged, the control 32 is locked out so that no electrical power can be present in the coupler 14. Thus, the risk of electrical shock is further eliminated.

As indicated above, the first dual connector assembly of the charge coupling C forms the inlet 13 of the capacitive charge system. A pair of first connectors 25a, 26a of the inlet 13 connect to the lines 25, 26, respectively. Each connector 25a, 26a is a composite plate element that is comprised of dielectric material in the form of a dielectric plate 35 and a conductive terminal element 36 through which the lines 25, 26 receive the transmitted current (see the connector assembly in FIGS. 2, 2a for more detail).

Preferably, the ceramic plate 35 is fixed to the conductive terminal element 36 by a solder layer of nickel tin alloy that is applied by vapor deposition and then the two parts mated together. This manner of connection provides maximum conductivity. Other interconnecting arrangements that can be used include a conductive silver epoxy adhesive. Of course, the terminal element 36 is formed of any highly conductive metal, such as copper. As shown in FIG. 1, the terminal elements 36 of the connector assembly of the inlet 13 being connected through the lines 25, 26 are now coupled to the conversion unit 27. In order to make all exposed live electric surfaces in the inlet 13 insulated, supplemental dielectric coating 35a is used where appropriate (see FIGS. 2, 2a).

According to an important aspect of the present invention, the first connectors 25a, 26a on both sides of the connector assembly have their dielectric plate 35 formed of a thin ceramic plate. Specifically, each plate 35 is preferably of a thickness in the range of between 0.007–0.045 inch with the preferred thickness being 0.03 inch. Each plate 35 has an area of approximately 2–8 square inches. A preferred ceramic is barium titanium oxide (BaTiO$_3$) since it has been found that this particular ceramic material exhibits a high dielectric constant. Depending on several formulation and operating parameters, this constant K is in the range of 7,000–12,000. Commercial quantities of this ceramic material with an average K equaling 10,000 is available from Alfa Aesar Corporation of Ward Hill, Mass.

The BaTiO$_3$ material is a silica glass composite that exhibits good machinability to allow smoothing by fine grinding and lapping, and comparatively high mechanical strength. While BaTiO$_3$ is the preferred ceramic for use in the connector assembly to form the dielectric of the inlet 13, it is important to note that other ceramics, such as lead zirconate titrate can be substituted. This combination metallic ceramic exhibits a K of 3,800 and is available from Piezo Systems, Inc. of Cambridge, Mass.

With reference now to the second dual connector assembly, which is on the side of the disengageable coupler 14, it can also be faced with a dielectric material, but in the preferred embodiment illustrated it takes the form of a deformable conductor, such as elastomer plate or sheet 40 (see FIGS. 1, 2 and 2A). At the present time, the preferred elastomer plate is formed of deformable silicone rubber that includes embedded microspheres of copper coated with silver (not shown).

The elastomer plate 40 is mounted on a foam base 41 fixed to terminal 42 (see FIG. 2a) so that upon application of pressure by the ceramic plate 35, progressive deformation takes place. Preferably, the elastomer plate 40 is stretched in position over the foam base 41. Conductive bands 42a on the terminal 42 extend down both sides of the second connectors.

The terminal 42 on each side of the coupler 14 is electrically coupled to the leads 22, 23 that are being supplied with high frequency A.C. current from the drive unit 21 (see FIG. 1). The foam base 41 is preferred to be made of conductive composite rubber, but can be nonconductive. The composition is selected to be soft relative to the elastomer plate 40 in order to provide full conformance during the application of pressure from the ceramic plate 35 of the inlet 13, as will be seen more in detail below. The terminal 42 is shielded on the back side by a single or double dielectric shield 43 (see FIG. 2a), which can be a plastic, such as acrylic plastic sheet. Additionally, standard RF shielding is provided around the entire coupling C (not shown).

Preferably, the foam base 41 is formed so as to have a convex operative surface (see FIG. 2a) whereby the elastomer plate 40 is also convex in shape. This feature performs an important function of making certain that there is no air layer trapped between the dielectric ceramic plate 35 and the conductive elastomer plate 40 as pressure is progressively applied when the charging coupling C is being engaged (see action arrows in FIG. 2a). Preferably, the formation of the foam base 41 is such that it varies from soft to softer toward the center of the convex form so that once the plates 35, 40 are fully engaged, the pressure across the interface is substantially the same (see, for example, FIG. 3).

While any number of selected materials can be used to form the capacitor interface, including within the broadest aspects of the present invention materials yet to be discovered, at present the preferred embodiment of the elastomer plate 40 is a composite silicone rubber with embedded copper/silver spheres sold under the trademark CHOMERICS, CHO-SEAL 1285, a product of Parker-Seal Co., division of Parker-Hannefin Corp. of Woburn, Mass. A similar suitable composite conductive rubber is presently manufactured and offered under the trademark TECHNIT of TWP Company, located in Cranford, N.J. Furthermore, if desired to add additional conductivity across the interface between the dielectric ceramic plate 35 and the conductive elastomer plate 40, a thin metal sheet, such as silver foil, may be added. Still another viable alternative material is inorganic or organic (for example, carbon) aerogel (see Inorganic and Organic Aerogels, MRS Bulletin, December, 1990).

In all of the above preferred and suggested variations for the first and second connectors of the inlet 13 and the coupler 14, respectively, each is contemplated as being superior in performance over the prior art for transmitting electric current across a coupling. Specifically, the charge coupling C of the present invention is characterized by lower cost compared to the inductive coupling of the prior art and considerably lighter in weight. Furthermore, the use of the ceramic plate 35 and any suitable dielectric coating 35a on all other exposed surfaces of the connector assembly of the inlet 13 eliminates any possibility of unintended electrical discharge from the electric vehicle side 11. Furthermore, the capacitive nature of the charge coupling C means that there is no magnetic field generated to interfere with electronic equipment, such as pacemakers, or to cause other annoyances, such as magnetizing mechanical devices or mechanisms in watches or the like. Furthermore, the charge coupling C of the present invention exhibits no excessive power loss, such as is caused in inductive couplings due to eddy currents. Any losses due to hystersis in the dielectric materials is insignificant. The small amount of heat generated can be easily dissipated by a thermoelectric cooler or the like (not shown). Furthermore, with regard to both inductive and conductive couplings of the prior art, the arrangement of the present invention provides not only greater reliability, but minimum maintenance requirements.

As a specific example of a prototype disengageable charge coupling C, the connector assembly of the inlet 13 was constructed having each ceramic plate 35 with a surface area of 4 square inches. The thickness of the plate was chosen as 0.03 inch. The elastomer plate 40 was selected to match this 4 square inch surface area. When the charge coupling is formed by bringing the coupler 14 into the inlet 13 and pressing the plates together, as shown in FIG. 3 and as described previously, each of the two capacitors in the mated position has a measured value of capacitance of approximately 5–10 nanofarads. In the prototype, the AC power of 110–120 volts AC is stepped up in the high frequency drive unit 21 to generate high voltage, AC power at a frequency of 500 kilohertz, which is slightly higher than the maximum frequency used in commercial inductive type chargers. Voltage in the range of 250–600V is contemplated, and 400 volts is selected as the exemplary charging voltage across the coupling. Utilizing these values in the basic equation for current through a capacitor yields a result of 6 amps. Given all of the advantages of the disengageable capacitive charging as taught by the present application, this result is consistent with the requirements needed in the automotive industry for electric vehicles.

One of the keys to making the charge coupling C successful is minimizing the thickness of the dielectric separating the conductive terminals of the inlet 13 and the coupler 14. Thus, as illustrated in the alternative embodiment to be described in accordance with FIGS. 6–7 where a dielectric is used on both sets of terminals, a similar result from the test prototype can be obtained theoretically by substituting a dielectric plate on the coupler side for the conductive elastomer plate 40.

Furthermore, the electrical current that can be successfully transmitted through the charge coupling C can be substantially increased with a reduction in the thickness of the dielectric/ceramic plate 35 of the composite plate element of the first connector. For example, it has been discovered that the BaTiO$_3$ ceramic material is very hard, but not brittle, and thus can be reduced in thickness to at least 0.01 inch. This reduction alone is operative to triple the current that can be transmitted through the coupling C to charge the battery, such as 18 amps. Such a capacitive charging system would be particularly useful for fast recovery charging of the battery B.

Another key to allowing capacitive charging through the coupling C that relates to the ceramic plate 35 is the smoothness of the operative surface that engages the elastomer plate 40. As indicated above, this particular ceramic exhibits excellent machinability, and thus during the manufacture of the plate 35, the surface is carefully ground smooth and lapped. This feature, along with the use of a flat mold that is ultra smooth for forming the elastomer plate 40, and with the convex configuration of the operative surface of the plate 40, the elimination of any air pockets or air layer that could lower the effective dielectric constant K is assured. In effect, by thus careful preparation of the operative surfaces of the connector plates 35, 40, the equivalent dielectric constant within the capacitors formed as described, can actually be effectively increased. Also, selecting high grade silica and selecting smaller grain size for the dielectric material can further raise the effective dielectric constant K and thereby increase the capacity for transmitting electrical current across the coupling C.

As an example of increasing the efficiency in the prototype utilizing the parameters listed above, a ceramic material with a normal dielectric constant of 7,000 can be increased at least up to a K of 12,000. With this increase, a corresponding substantial theoretical increase in the current is possible.

Of course, similar changes in the operating parameters of the capacitors of the present invention can achieve similar dramatic results. Thus, increasing the frequency of the power supply from the drive unit 21 from 500 kilohertz to 1,000 kilohertz (1 megahertz) the resulting increase in current that can be realized in operation is doubled. Similarly, doubling or even tripling the area of each ceramic plate 35 of the inlet 13 provides an equal geometric increase in the current output. For example, taking the basic prototype system where the current of 6 amps is obtainable, doubling the area of each ceramic plate 35 provides a current output of 12 amps; whereas, tripling the size would naturally increase the current output to 18 amps. Finally, not only is the output in efficiency of the charging system capable of being increased by changing the characteristics/size of the dielectric ceramic plate 35, but similar increases can be obtained by making changes in the conductive elastomer plate 40. Indeed, other conductive elastomers or the like, such as composite polypropylene with embedded conductive components, such as microspheres are contemplated in accordance with the broader aspects of the present invention. Polyester, and other deformable materials with embedded conductive components to form the plate 40 are also likely candidates for use.

The following tables provide a theoretical illustration of varying the parameters in a capacitive charging system for various levels of charging current, according to the prototype described:

TABLE 1

| | |
|---|---|
| Dielectric Plate | 0.03 inch |
| Current | 100 amps |
| Voltage | 500 volts |
| Plate Area | 4 square inches |
| Dielectric Constant (K) | 10,000 |
| Frequency | 425,160 |

TABLE 2

| | |
|---|---|
| Dielectric Plate | 0.03 inch |
| Current | 50 amps |
| Voltage | 240 volts |
| Plate Area | 25 square inches |

TABLE 2-continued

| Dielectric Constant | 10,000 |
| --- | --- |
| Frequency | 70,860 |

TABLE 3

| Dielectric Plate | 0.03 inch |
| --- | --- |
| Current | 400 amps |
| Voltage | 600 volts |
| Plate Area | 25 square inches |
| Dielectric Constant | 10,000 |
| Frequency | 226,750 |

A novel approach of increasing the charging capacity that can be accommodated across the charge coupling C of the present invention, is illustrated in FIG. 2b of the drawings. In this arrangement, rather than simply increasing the size of the dielectric/ceramic plate 35 to increase the capacity, it is desirable to form a capacitor on both sides of the terminal element 36. To do this, a ceramic plate 35 is bonded by electrically conductive solder to both sides of the terminal element 36 and a pair of conductive elastomer plates 40 are used on each side.

As illustrated, dual leads 23, connected by a flexible band 50 can be employed for attaching to dual terminals 42. In this instance, power transfer occurs on both sides of the terminal element 36 thus effectively doubling the charging capacity. As will be apparent, the flexible band 50 and a floating mounting of each terminal element 36 at the point of coupling with the lines 25, 26 (see FIG. 1) is effective to accommodate the small amount of movement required as pressure is applied (note action arrows in FIG. 2b). Using this approach, a higher capacity, but more compact charge coupling C is realized. In other words, the size of the plate 35 does not have to be doubled in a single plane to obtain the same substantially double charging capacity.

In the instance where it is preferred to substitute a dielectric material for the elastomer plate 40 in the coupler 14, it is simply necessary to remember that the total thickness of the two plates 35, 40 combined determine the dielectric constant. For example, assuming the ceramic plates 30 are smoothed to eliminate air pockets and the convex geometry of the plate 40 is employed to squeeze out any remaining air gap, in order to establish the same operating parameters as the primary prototype described above, the thickness of the dielectric plate 35 must simply be reduced by one half with an opposed dielectric plate 40 being selected as the same thickness. Thus, assuming a perfect surface mating as described to eliminate the presence of air, then the same operating capacity (for example, 6 amp charging) can be obtained.

In this preferred embodiment variation where there is face to face dielectric plates forming the transmitting interface, there is a similarity with regard to the second or alternative embodiment shown in FIGS. 6–7 and as will be further described below. It is suggested for example in order to accomplish this result, a dielectric material can be dissolved in a flexible compound. The dielectric material is backed with the conductive foam base 41 of the second connectors of the coupler 14.

As indicated above, in order to provide the requisite pressure between the conductive elastomer plate 40 of the preferred embodiment with the dielectric ceramic plate 35 on both sides of the coupling C a unique holder 55 is proposed, as best illustrated in FIGS. 2–5. Thus, the plates 35 affixed to the conductive terminal elements 36 (see FIG. 2) are mounted within the inlet 13 with the plates 35 facing outwardly, and so as to be movable laterally in the direction of the arrows. To insulate each terminal element 36, a dielectric and resilient pad 56 is adhesively attached to the back, and in turn the pad is supported by movable block 57 on each side of the inlet. These blocks 57 are guided on one or more shafts 58 that are supported on stationary tracks 59 (only partially shown in FIGS. 3 and 4). Positioned between the tracks 59 is a center pusher 60 (see FIG. 5).

Remembering that this connector assembly of the inlet 13 with its first connectors is to be mounted within the vehicle, the entire inlet is defined by the housing 54. Between the side of the housing 54 and the bottom of the pusher 60, a spring 62 is provided to constantly urge the pusher to the left, as viewed in FIGS. 2, 3 and 5. This spring bias keeps the ceramic plates 35 in the standby, retracted position until activated by the person using the charge coupling C.

Figure 5:
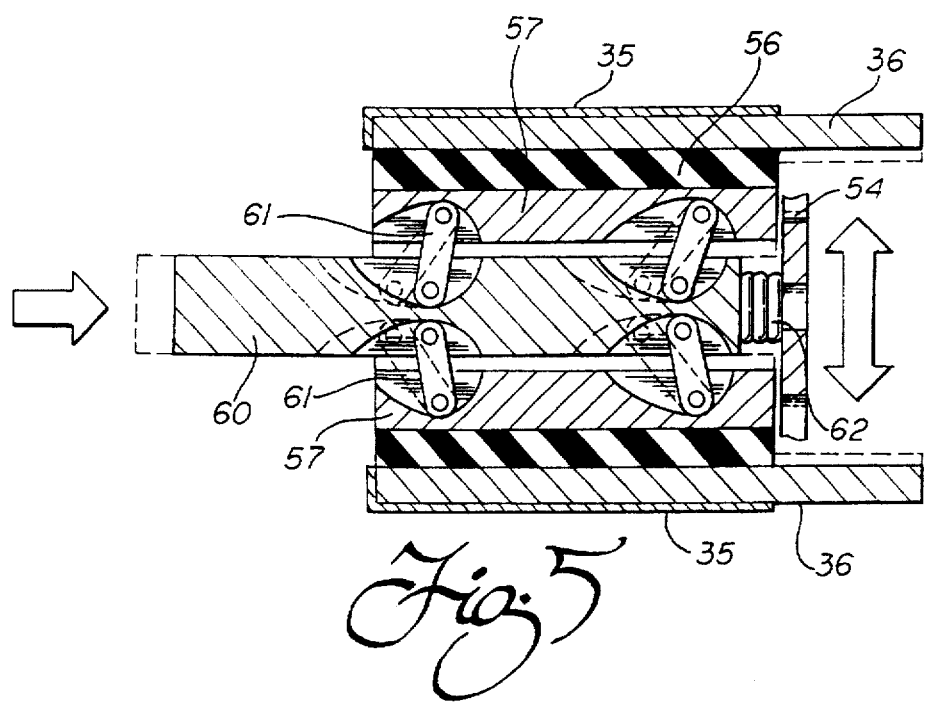
FIG. 5 is a cross sectional view showing the operation of the toggle mechanism for effecting shifting operation of the connector assembly of the inlet.

The pusher 60 actually operates to move the plates 35 outwardly in response to a toggle mechanism to engage the coupling C, as best shown in FIG. 5. Thus looking at the blocks 57 and the pusher 60 in cross section, a plurality of toggle links 61 can be seen pivotally attached to the two parts. As the pusher 60 is moved to the right, as shown in FIG. 5, the toggle links 61 move from the dotted line to the expanded full line position, thus expanding the entire connector assembly of the inlet 13 outwardly. Of course, once the pressure is released, the compression spring 62 at the bottom lifts the pusher 60 back up (see dotted line position of FIG. 5) so that the plates 35 are again withdrawn to the standby position. Reference can be made to FIG. 2 showing the spring 62 having returned the pusher 60 to the standby position with the dielectric plates 35 retracted out of engagement with the conductive plates 40 to effect disengagement of the coupling.

The support arrangement for the second connectors of the coupler 14 that are to mate with the first connectors of the inlet 13 takes the form of a telescoping slide 70 that fits within the housing 54. The slide carries a reciprocating handle 71 with a projection 72 that is operative when the handle 71 is pressed downwardly to actuate the pusher 60, and in turn the outward movement of the plates 35. During disengagement of the coupling C, a coil release spring 73 (see FIG. 2) is adapted to lift the handle 71, release the pusher 60 and effect the inward motion to the standby position of the ceramic plates 35.

Mounted on two sides of the handle 71 are a pair of latching fingers or hooks 75 so that once the telescoping slide 70 is pushed into position within the housing 54, the terminal hook section of these fingers drops into opposing latching recesses (see FIGS. 4, 4a); the recesses being designated by the reference numeral 76. As the handle 71 is pressed downwardly latching the fingers 75 into the recesses 76, the proper outward pressure of the ceramic plates 35 against the conductive elastomer plates 40 is realized (see FIG. 3). In other words, the terminal or hook sections of each finger 75 drops into the recess 76 all within the natural inward movement of the handle 71 (see full line to dotted line movement depicted in FIGS. 3 and 4 and the action arrows indicating the handle 71 movement). In the fully latched position, a cap 77 operates against a lever 78 at the opposite end or mounting end of the finger 75 to release the latching function. Thus, when the charge coupling C is ready to be disengaged the person operating the system simply pulls back on the handle, as shown by the dashed line action arrow in FIG. 4a, and the cap 77 operates against the lever 78 to lift the latching finger 75 so as to be disengaged from the recess 76. Of course, the latching and the disengagement of the fingers 75 takes place on both sides of the coupling C at the same time.

Figure 6:
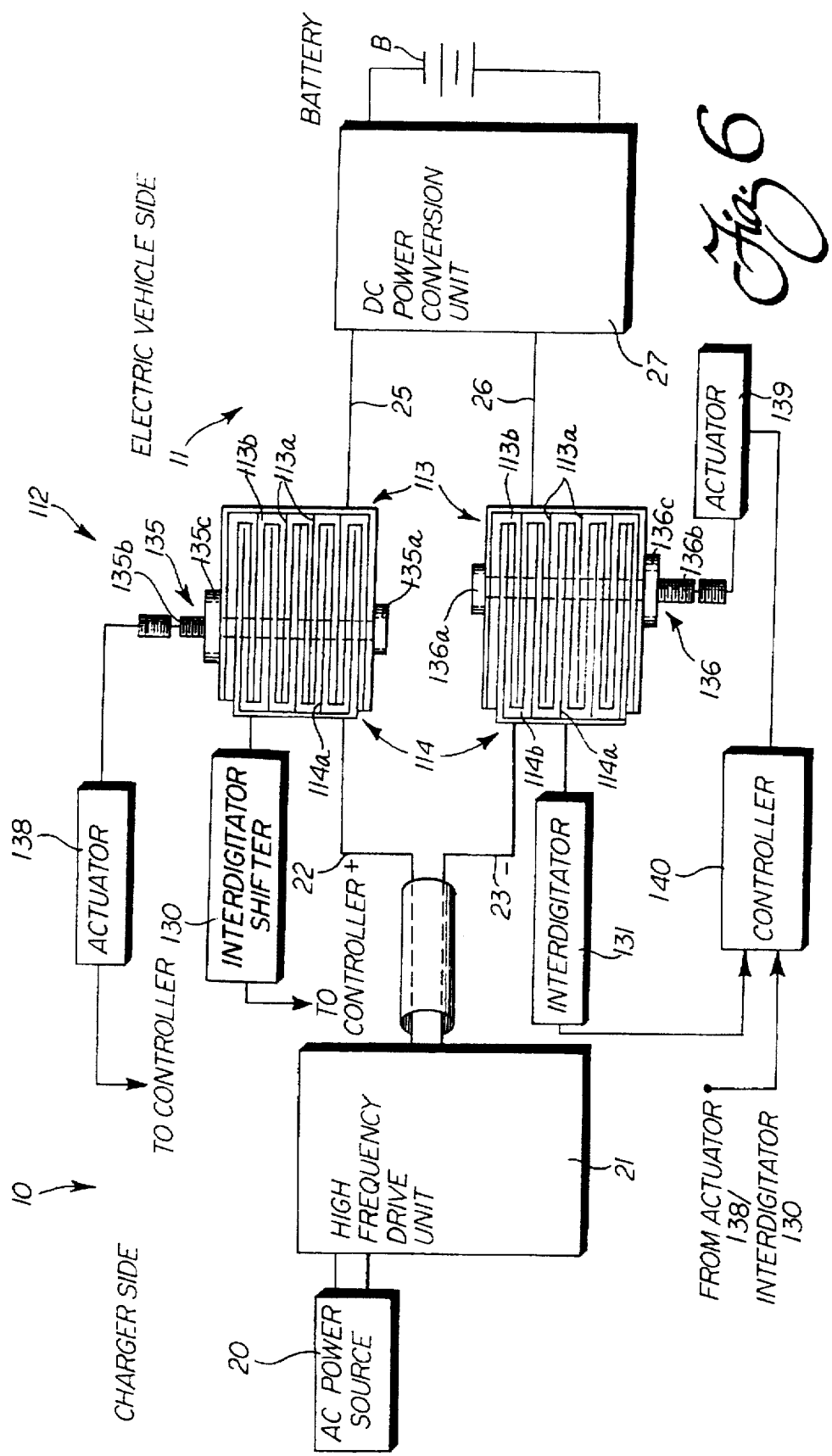
FIG. 6 is a schematic view of the alternative embodiment of the charging system of the present invention utilizing a charge coupling having multiple section connectors.

With reference now to FIG. 6 of the drawings, an alternative charging system built in accordance with the present invention is illustrated in schematic diagram form. The reference numerals designating components of this system that are identical to the preferred embodiment of FIGS. 1–5 are the same, components that are different are numbered for clarity in the 100 series of reference numerals. Thus, the system comprises a charger side 10 and an electric vehicle side 11. A charge coupling 112 is provided that is of a different construction, but which employs the same unique principles of the present invention in a broad sense.

The coupling 112 includes a pair of disengageable connector assemblies of a inlet 113/coupler 114, respectively. When engaged and power supplied from the AC power source 20 through the high frequency drive unit 21, power is being transferred through the coupling. The two sides of the inlet 113 and the coupler 114 are oppositely polarized, as in the preferred embodiment described above. Each of the connector assemblies of the inlet/coupler 113, 114 include dual first and second connectors, that is a pair on the coupler side and a pair on the inlet side. The connectors include interdigitated composite plate elements 113a, 114a with dielectric coatings 113b, 114b to form a pair of operable capacitors. It should be understood that while this charge coupling 112 is illustrated in the environment of an electric vehicle charging (or recharging) system, it is of course also consistent with the broadest aspects of the present invention, to employ the concepts for transferring high frequency AC electric power in any other environment that is consistent with the principles and requirements taught herein.

Generally, in this embodiment as well as in the preferred embodiment described above, in order to keep the connector assemblies of the inlet/coupler 113, 114 reasonably limited in size, the power transmission frequency is selected in the 500 kilohertz to 1 megahertz range and increases as the power transfer level increases. It is contemplated that at low power requirements, the power transfer through the connector assemblies of the system of the present invention can occur at a standard 60 hertz level even making them adaptable for use in household application. It is to be understood also that the other general descriptive material of this embodiment applies equally to the preferred embodiment described above, and vice versa.

On the charger side 10, the system delivers AC electric power through the oppositely polarized leads 22, 23. With suitable parameters in place as described above, the input on the charger side is rated at 100 amps and 500 volts (see Table 1) at a frequency of 500 kilohertz.

On the electric vehicle side 11, power is transferred over lines 25, 26 from the connectors of the inlet 113 to the DC power conversion unit 27. After being rectified and filtered, the DC power is then delivered to an energy storage device, such as the battery B, providing the desired charge. While any state of the art high frequency drive unit 21 and DC power conversion unit 27 can be utilized in accordance with the present invention, a particularly adaptable and successful arrangement is found in prior U.S. Pat. No. 4,740,739 entitled "Battery Charging Apparatus and Method." In some circuit arrangements, regulation is handled on the charger side 10, leaving only the rectification function to be performed on the electric vehicle side 11.

Accordingly to an important aspect of the present invention, the inlet/coupler 113, 114 are disengageable or separable in a unique manner. Dual first and second connectors on each side are easily separable to interrupt the power transfer from the charger side 10 to the electric vehicle side 11. The purpose of this interruption is of course to allow the electric vehicle to be driven by the user until such time as the energy level in the battery B drops to a level when recharging is needed. Then when a recharging station is reached, the first and second connectors of the inlet/coupler 113, 114, which are preferably coupled together on each side, are reengaged and power once again delivered to recharge the battery B.

While reference is made in this description of the alternative embodiment to simply a battery, it is of course to be recognized by those of skill in the art that any type of battery or batteries, including a common lead acid battery is contemplated to be used in accordance with the charging system. Likewise, within the broadest aspects of the present invention, any other storage devices can be utilized, if desired.

Each connector assembly of the coupler 114 has a multi-section plate 114a that is to mate with the corresponding multi-section plate 113a of the inlet 113. In order to bring the plates 113a, 114a together, suitable interdigitators, or shifters 130, 131 are used. In effect, these interdigitors 130, 131 simply move or shift the multi-sectioned plates 113a, 114a together in the interdigitated fashion illustrated. Any suitable device can be used, such as a linear motor, and of course the plates 113a, 144a can be moved partially, or in some instances possibly totally together by manual manipulation. In the latter case, it is desirable to include some mechanical force multiplying means, such as a cam/lever arrangement, to assist in the process.

Once the plates 113a and the plates 114a are fully interdigitated, a pair of holders, generally designated by the reference numerals 135, 136, respectively, are actuated in order to firmly clamp the plates in their interdigitated position. Each of the holders 135, 136 includes a cross arm 135a, 136a on the bottom, to which is rotatably mounted a lead screw 135b, 136b, and which is threadedly engaged with opposed cross arms 135c, 136c, respectively. As the lead screws 135b, 136b are turned by respective rotary actuators 138, 139, the opposed arms 135a, 135c and 136a, 136c are drawn toward each other to provide a firm clamping arrangement of the plates 113a, 114a of the inlet 113 and the coupler 114, respectively.

Once the inlet/coupler 113, 114 are engaged, as described, the charge coupling 112 between the charger side 10 and the electric vehicle side 11 is now effected. When power is applied from the AC power source 20, the leads 22, 23 provide high frequency AC power across the multi-section plates 113a, 114a in an alternative fashion in order to establish a compact electrostatic field that transmits the electric current in a highly efficient manner. As a result, substantially full power is delivered to the electric vehicle side 11 to charge the battery B in the desired manner.

Preferably, the operation of the interdigitators 30, 31 and the actuators 138, 139 is through a controller 140. Thus, the operation of engaging and disengaging the inlet/coupler 113, 114 is automated in the preferred embodiment shown. However, as mentioned above and as will be realized, at least a portion of the engagement/disengagement can be manual, as with the preferred embodiment described above, if desired. As illustrated, the holders 135, 136 and their actuators 138, 139 are located on the electric vehicle side, thus allowing a smaller physical size for the coupler 114. This concept of course makes the operation easier when performed manually.

For disengagement, the holders 135, 136 are operated by the respective actuators 138, 139 to release the holding pressure, and then the interdigitators 130, 131 are operated to withdraw one or both of the second connectors to a position of full disengagement.

Since all of the plates 113a, 114a, including the edges include dielectric material/coating 113b, 114b, there is no possibility of electric shock in the event that the user inadvertently touches one of the connectors. At the next charging/recharging station, the controller 140 reverses the procedure whereby the interdigitators 130, 131 move the multi-section plates 113a, 114a back into interdigitated relationship, and then the actuators 138, 139 are operated to firmly hold the plates together, as shown in FIG. 6.

To obtain the highest efficiency of electric current transfer from the charger side 10 to the electric vehicle side 11, the dielectric material/coating 113b, 114b must be carefully chosen. One of the best choices for a flexible coating of dielectric material that exhibits a suitable dielectric constant of K 2.2 for the multi-section plates, and in addition has a relatively high dielectric strength and is particularly adapted for pulse handling circuits, is polypropylene. Ideally, the dielectric coating 113b, 114b should be in the range of 0.005–0.020 inch thick in this embodiment. Other suitable dielectrics that have been found to provide acceptable characteristics are metalized polyester, polycarbonate, polystyrene and polyphenylene sulfide. In addition, it is contemplated that titanium dioxide enamel and ceramic materials as described with regard to the preferred embodiment above, are useful to cover at least a portion of the plates where flexure is not required.

With reference now to FIGS. 6a, 6b, there is a schematic showing of an embodiment of this form of the invention comprising a disengageable capacitive connector assembly 150. In this FIG. 6a, 6b, it is shown in its disengaged or separated standby position. A key feature of the assembly 150 is that first and second connectors 151, 152 of the inlet 113 and the coupler 114, respectively, utilize accordion or fan folded multi-section composite plates 151a, 152a, and which of course have a dielectric coating on all surfaces and edges, as will be described later in detail.

As illustrated, a wall 153 on the electric vehicle includes a suitable access port 154 through which the connector 152 can be inserted when charging is desired. Each of the folded multi-section plates 151a, 152a include separate holders 160, 161 operated by actuators 162, 163 by a controller (not shown) similar to the controller 140. For example, when the lead screw of the holder 161 is actuated to compress the multi-section plate 152a, as shown in FIG. 6a, it can be easily inserted through the access port 154 to a position inside the vehicle.

To assist in at least the initial manipulation of the folded multi-section plate 152a, a suitable handle 165 is provided. As the plate enters the access port 154, the pressure afforded manually, and/or by the interdigitator 166, is effective to slide the holder 161 back to the relative dotted line position on the handle 165. Once positioned inside the vehicle, side wings 167, 168 are allowed to pivot outwardly and as they do the folded multi-section plate 152a expands by resilient memory. The extension is to an open position that corresponds with and is opposed to the open multi-section plate 151a. As shown in the side view of FIG. 6c, the holder 160, like the holders 135, 136 of the embodiment shown in FIG. 6, include opposed arms 160a, 160c that are moved toward and away from each other by actuation of jack screw 160b by the actuator 162.

With reference now to FIG. 7, an enlarged view of a fan folded section of the multi-section composite plates 151a is shown. As indicated above, each of the plates includes a dielectric coating 151b, 152b, respectively. The dielectric coating 151b, 152b covers all surfaces, as well as the edges of the plates. Each fan folded section, as shown in FIG. 7, includes two flat plate elements that are joined by alternative large and small curved spring leaf junctures 170, 171.

In some instances, the holder 160 and actuator 162 on the electric vehicle side can be eliminated. This can be done by relying solely on the folding and compressing action of the plate 152a of the coupler 114 after it engages the plate 151a of the inlet 113. Upon release, the spring action of the junctures 170, 171 on both plates unfold in readiness for disengagement. The use of this concept allows a further reduction in the initial cost of the charge coupling 112.

As illustrated, the plate 151a has a line 172 connected at one of the junctures 170 for delivery of the current to the conversion unit 27 and the battery B; and the plate 152a has a lead 173 going back to the AC power drive unit 21. It will be realized that when the two plates 151a, 152a with their respective dielectric coatings 151b, 152b are brought together in face to face engagement, a capacitive relationship is established and electrons flow from the compact electrostatic field generated, and thus through to the line 172 for charging the battery B.

With reference back to FIG. 6b, the manner in which the first and second connectors 151, 152 of the charge coupling 112, that is, the multi-section plates 151a, 152a, are engaged will now be described. It is to be understood that the second connector 152/plate 152a of the coupler 114 is unfolded to an open position and just inside the access port 154. The multi-section plate 151a of the first connector 151 of the inlet 113 is unfolded as shown, through operation of the actuator 162, and is in the withdrawn position. It is ready to be advanced forward toward the access port 154 to be met by the second connector 152 of the coupler 114. As the first connector 151 moves to the intermediate position, it engages the now open connector 152, essentially as shown in FIG. 7, wherein the plates are partially interdigitated. Once the plates are fully interdigitated, the differential sized corner junctures 170, 171 snap together, and then the actuator 162 is operative to close against the assembled plates to provide a firm clamping relationship. This action forms a highly efficient capacitor for the high frequency AC electric current transfer.

When disengagement is needed for allowing the electric vehicle to move away from the recharging station, the procedure is reversed; namely the actuator 162 is operated to allow the spring memory to open the folded multi-section plate 151a, and at the same time the plate 152a is also opened. Next the interdigitator 175 backs the entire first connector 151 away from the second connector 152 and then the interdigitator 166 withdraws the second connector back through the port 154. The wings 167, 168 serve to collapse the plate 152a and the holder 161 is then actuated to provide additional compression, if desired, to assure the secure compactness needed to move to the full rest position (see FIGS. 6a, 6b).

Preferably, the core of the connectors 151, 152 are formed of thin, spring-like metal alloy and are highly conductive, such as beryllium/copper or phosphorous/bronze. Either of these metal alloys allows the formation of curved, spring-like junctures 170, 171 so that the expansion or opening of the multi-section folded plates 151a, 152a is automatic by spring memory.

In view of the foregoing description, it will now be apparent that the present invention provides an improved coupling C, and alternative coupling 112, both for interconnecting an AC power input to an electrical operative device, mechanism or circuit. As shown the circuit is a charging system for an electric vehicle. The charge coupling C, 112 is formed by pair of connector assemblies, one forming the inlet 13, 113, and the other forming the coupler 14, 114, respectively.

In the preferred embodiment, the coupling C employs dielectric plates 35 of minimum area since they are fabricated of ceramic materials having a relatively high dielectric constant in the range of 7,000–12,000. A preferred ceramic is $BaTiO_3$. The second connector of the preferred embodiment is conductive, and is preferably formed of composite rubber plates 40 with embedded metal elements.

The alternative charge coupling 112 is, on the other hand, one that employs dielectric coatings 113b, 114b or 151b, 152b on multi-section plates 113a, 114a or 151a, 152a for the first connector of the inlet 113 and the second connector of the coupler 114. The various parameters, including the dielectric constant K and the interface area of the plates, is varied to provide the desired charging input to the battery B. The alternative embodiment provides teaching a working arrangement where both connectors of the inlet 13 and the coupler 14 are fully covered with the dielectric coating, thus eliminating any potential for electric shock. The communications link also assures shock-free operation. According to the invention, both arrangements are highly efficient in transmitting the high frequency AC electric current at relatively high voltage. Both are inexpensive to build, easy to maintain and highly efficient and reliable in operation.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A disengageable electrical capacitive coupling for transmitting AC electrical current at relatively high voltage in the range of 250–600 volts from an electric lead to an electric line, comprising:

a first connector for receiving said AC electrical current and being connected to said line;

a second connector connected to said lead for transmitting said AC electrical current to said first connector;

dielectrical material positioned between said first and second connector; and a holder for securing said connectors together with said dielectric material in between for forming an interface sufficient for establishing a compact electrostatic field, and for disengaging said connectors, whereby said AC electrical current is efficiently transmitted by said capacitive coupling to said electric line from said electric lead and interrupted upon disengagement.

2. The coupling of claim 1, wherein is provided dual first and second connectors, leads and lines to form a full coupling with alternating oppositely polarized electrical charges for AC current transmission.

3. The coupling of claim 2, wherein the dual first connectors include a conductive terminal element, and a dielectric plate fixed thereto forming the dielectric material of the coupling.

4. The coupling of claim 2, wherein the dual first connectors including a conductive core element and a dielectric coating fixed thereto forming the dielectric material of the coupling.

5. The coupling of claim 3, wherein said dielectric plate is ceramic having a relatively high dielectric constant in the range of 7,000–12,000.

6. The coupling of claim 5, wherein said ceramic plate is formed of barium titanium oxide ($BaTiO_3$).

7. The coupling of claim 6, wherein the ceramic plate has a thickness in the range of between 0.007–0.045 inch.

8. The coupling of claim 2, wherein the dual second connectors include a deformable conductor for mating with the first connectors.

9. The coupling of claim 8, wherein the deformable conductors are comprised of a flexible silicone rubber stretched over a foam base and having a convex operative surface for mating with the first connectors.

10. The coupling of claim 2, wherein said first and second connectors, leads and lines form a charge coupling for an electric vehicle, said first connectors being positioned in the inlet of the electric vehicle and the second connectors forming the coupler for engagement and disengagement of the coupling.

11. A charging system for a direct current energy storage device comprising:

an alternating current power source;

a high frequency drive unit for transmitting AC electrical current from the power source at relatively high voltage in the range of 250–600 volts;

a DC power conversion unit to rectify and regulate the DC electrical current for charging the energy storage device; and a disengageable capacitive charge coupling between said drive unit and said conversion unit, whereby the charging current is efficiently transferred by said capacitive coupling to said energy storage device.

12. The charging system of claim 11, wherein said coupling includes dual first and second connectors, a dielectric material, and a holder for securing each first and second connectors together with the dielectric material between, and for disengaging said connectors; whereby an interface sufficient for establishing a compact electrostatic field is established for transmitting said AC electrical current.

13. The charging system of claim 12, wherein said dielectric material is a barium titanium oxide ($BaTiO_3$) ceramic plate fixed to each of said first connectors.

14. The charging system of claim 13, wherein said second connectors comprise a deformable conductor to mate with the ceramic plate of the corresponding first connectors.

15. The charging system of claim 12, wherein said holder includes a housing in which said first connectors are positioned;

a slide in which said second connectors are positioned adapted for telescoping movement into said housing for aligning the corresponding first and second connectors;

a toggle linkage mechanism for moving the mating connectors together in a pressure relationship;

a handle on the coupler for engaging and disengaging the connectors through operation of the toggle mechanism; and a latch for securing the slide within the housing and operated by said handle.

16. A disengageable capacitive charge coupling for use in transmitted high frequency AC electrical current at relatively high voltage in the range of 250–600 volts from a power source to a DC current rectifier and energy storage device comprising:

a first connector having a multiple section conductive plate connected to said rectifier and storage device receiving said AC electrical current;

a second connector having a mating multiple section conductive plate connected to said power source for transmitting said electrical current;

dielectric material between said first and second connectors;

an interdigitator for said plates; and a holder for securing said plates together forming an interface sufficient for establishing a compact electrostatic field and for disengaging said plates, whereby said AC charging current is efficiently transmitted by said capacitive charge coupling to said DC energy storage device from said power source and interrupted upon disengagement.

17. The capacitive charge coupling of claim 16, wherein is provided dual first and second connectors with the multiple section conductive plates being fan folded and adapted for mating together to form the coupling;

said dielectric material being formed as a coating on both sides of said plates.

18. The capacitive charge coupling of claim 17, wherein said plates are thin, spring metal for opening by spring memory and said coating comprises polypropylene.

19. The charge coupling of claim 18, wherein said plates include flexible junctures between the sections that nest together and provide the spring memory for opening said plates.

20. The charge coupling of claim 17, wherein said first connectors form an inlet of an electric vehicle having an energy storage device for charging, and wherein said second connectors form a coupler for receipt within the inlet for charging said energy storage device of said vehicle.

* * * * *